Nov. 26, 1929.  E. P. G. WÜNSCH  1,737,487
LATERAL READING COMPASS
Filed Dec. 8, 1927
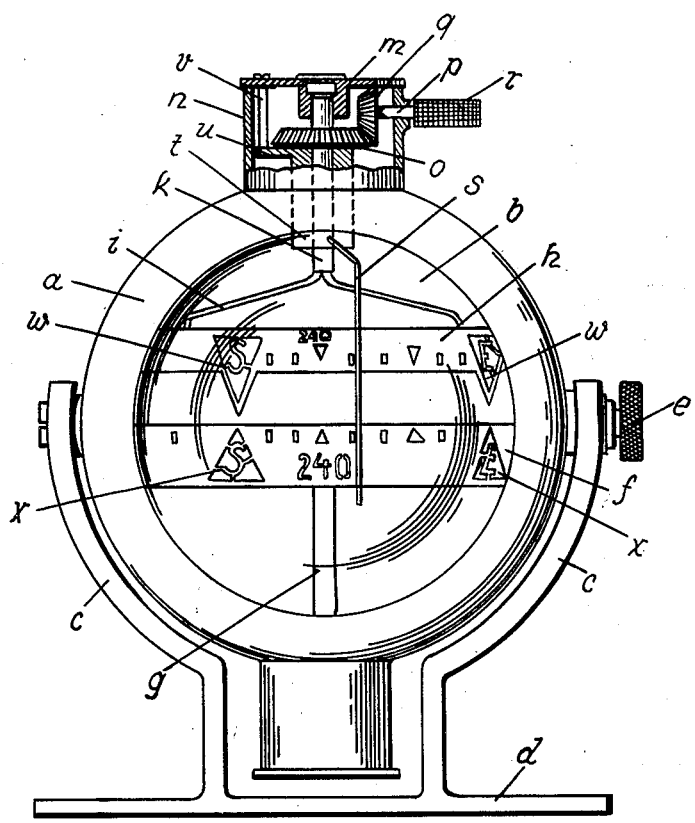
Inventor:
Erich Paul Guido Wünsch
by [signature]
attorney Patented Nov. 26, 1929

1,737,487

UNITED STATES PATENT OFFICE

ERICH PAUL GUIDO WÜNSCH, OF STEGLITZ, NEAR BERLIN, GERMANY, ASSIGNOR TO ASKANIA-WERKE A.-G. VORMALS CENTRALWERKSTATT DESSAU UND CARL BAMBERG-FRIEDENAU, OF BERLIN-FRIEDENAU, GERMANY, A CORPORATION OF GERMANY

LATERAL-READING COMPASS

Application filed December 8, 1927, Serial No. 238,569, and in Germany December 10, 1926.

This invention relates to drum compasses, and more particularly to aircraft compasses for lateral reading, that is, compasses the card of which may be read or inspected from the side of the compass and not as in the ordinary compass from above. It is known that for the purpose of steering aircraft, it is of the highest importance that the pilot should be able to see by a glance at the compass that he is steering a correct course, without having to read the angle of the course steered. It has already been proposed for the above purpose to arrange on the compass card a separate course indicator which, after setting to the desired angle of steering, could be coupled to the compass card, and which, if the correct course is kept, must coincide with the lubber's line of the compass. Such an arrangement is however only possible in compasses with a compass card arranged horizontally above the compass bowl.

According to the present invention there is provided a separate course or steering card which is provided with a scale divided into degrees corresponding to the scale of the compass card, and has moreover, at one or more points of the circumference, conspicuous, easily recognizable marks to which correspond similar marks on the compass card. The course or steering card can be set by means of a setting screw or the like arranged outside the compass bowl, opposite the lubber's line to the steering angle desired, so that the pilot when steering or navigating the aircraft has merely to see that the marks provided on the steering card coincide with the marks on the compass card.

The marks are preferably arranged at the four cardinal points of the steering card and of the compass card, in the form of triangular recesses, arrows or the like, the points of which face each other and stand out clearly from the surface of the cards and from the back-ground.

The accompanying drawing shows by way of example, in front of elevation, a fluid compass according to the invention for aircraft.

The compass body consists essentially of the outer compass-case $a$ of substantially hemispherical shape in which is arranged a hollow ball $b$ made of glass and filled with a suitable liquid. The compass case $a$ is rotatably mounted in a bracket $c$ provided with a bed plate $d$ and can be locked in a given position by means of a screw $e$. In the interior of the hollow ball $b$ is mounted in a well known manner on a pin $g$ a compass card $f$. Above the compass card $f$ is arranged a card $h$ of exactly or approximately the same diameter for setting the course, which card is secured by means of a number of arms $i$ to a vertical spindle $k$ passing at the top through the case $a$. The spindle $k$ is mounted at its upper end in the cover $m$ of a cylindrical superstructure $n$ of the case $a$ forming a part of the compass body and has a bevel wheel $o$ which meshes with a second bevel wheel $q$ mounted on a horizontal spindle $p$. To the end of the spindle $p$ which projects from the superstructure $n$, is secured a setting button $r$, by turning which, the steering card $h$ can be adjusted in any desired manner. Over the compass card $f$ and the steering card $h$ extends a lubber's line constituted by a wire $s$, or the like, the upper end of which extends obliquely towards the axis of the compass and is secured to a sleeve $t$ enclosing the spindle $k$. The compass card $f$ is displaced 180° from the usual arrangement, that is, the north-seeking pole of the needle is adjacent the "S" graduation. This arrangement is necessary as the lubber's line $s$ is arranged on the front side of the compass case, i. e. on the side on which the pilot is standing. The sleeve $t$ carries at its upper end a lateral projection $u$ which is connected by a pin $v$ to the cover $m$ of the casing superstructure $n$. By turning the cover $m$ it is therefore possible to set the lubber's line $s$ in a well known manner.

The steering card $h$ is provided with a scale corresponding to the degree divisions of the compass card $f$, namely the degree numbering, and the scale divisions of the steering card $h$ as well as those of the compass card $f$, are formed by stamping out the annular card, preferably covered with a bright paint, so that owing to the dark background showing through, they stand out sharply from the card surface. Around the letters N, E, S, W indicating the four cardinal points of the cards $h$ and $f$, are further stamped out large triangular recesses $x$ and $w$ the points of which face each other. The recesses $x$ reach with their points approximately right up to the upper edge of the compass card $f$, whilst the recesses $w$ extend from the lower edge of the steering cards $h$ provided at the corresponding point with corresponding triangular points, close to the upper edge of the compass card $f$. The making of the degree numbers and scale divisions or strokes by stamping out the cards, as well as the arrangement of the triangular recesses $w$ and $x$, has besides the advantage of clearness, the further advantage of reducing the inertia.

When using the compass, the course to be kept is set at the lubber's line $s$ by turning the steering card $h$ by means of the button $r$. After that, when steering, it is no longer necessary to watch the lubber's line or to read the steering angle, the pilot has merely to see that the recesses $x$ of the compass card $f$, clearly visible at a glance, are opposite the corresponding recesses $w$ of the steering card $h$.

The invention is not limited of course to the construction shown but can be applied in the same or similar way to compasses of any other desired kind.

Having now particularly described and ascertained the nature of my said invention and in what manner the same is to be performed, I declare that what I claim is:—

1. In a lateral-reading compass, a substantially cylindrical compass card having direction-indicia on its periphery, a similar substantially cylindrical indicator similarly marked and rotatably mounted concentric with the axis of said card adjacent thereto, a lubber's line for reading both the card and indicator, and means for rotating the indicator to set a desired course in cooperation with the lubber's line.

2. A compass as per claim 1 wherein said card and indicator are sections of the surface of a sphere cut off by four adjacent parallel planes.

3. A compass as per claim 1 wherein the direction-indicia at the corresponding cardinal points of both cards consist of marks of triangular shape having their points facing each other.

4. A compass as per claim 1 wherein the direction-indicia at the corresponding cardinal points of both cards consist of marks of triangular shape having their points facing each other and formed by perforations of the card rim.

In testimony whereof I have affixed my signature.

ERICH PAUL GUIDO WÜNSCH.